Dec. 17, 1929.    G. SOMAJNI    1,739,562
DIRECT CURRENT SYSTEM
Filed Oct. 24, 1921    2 Sheets-Sheet 1

Inventor
G. Somajni
By Marks+Clerk
Attys.

Dec. 17, 1929.  G. SOMAJNI  1,739,562
DIRECT CURRENT SYSTEM
Filed Oct. 24, 1921   2 Sheets-Sheet 2
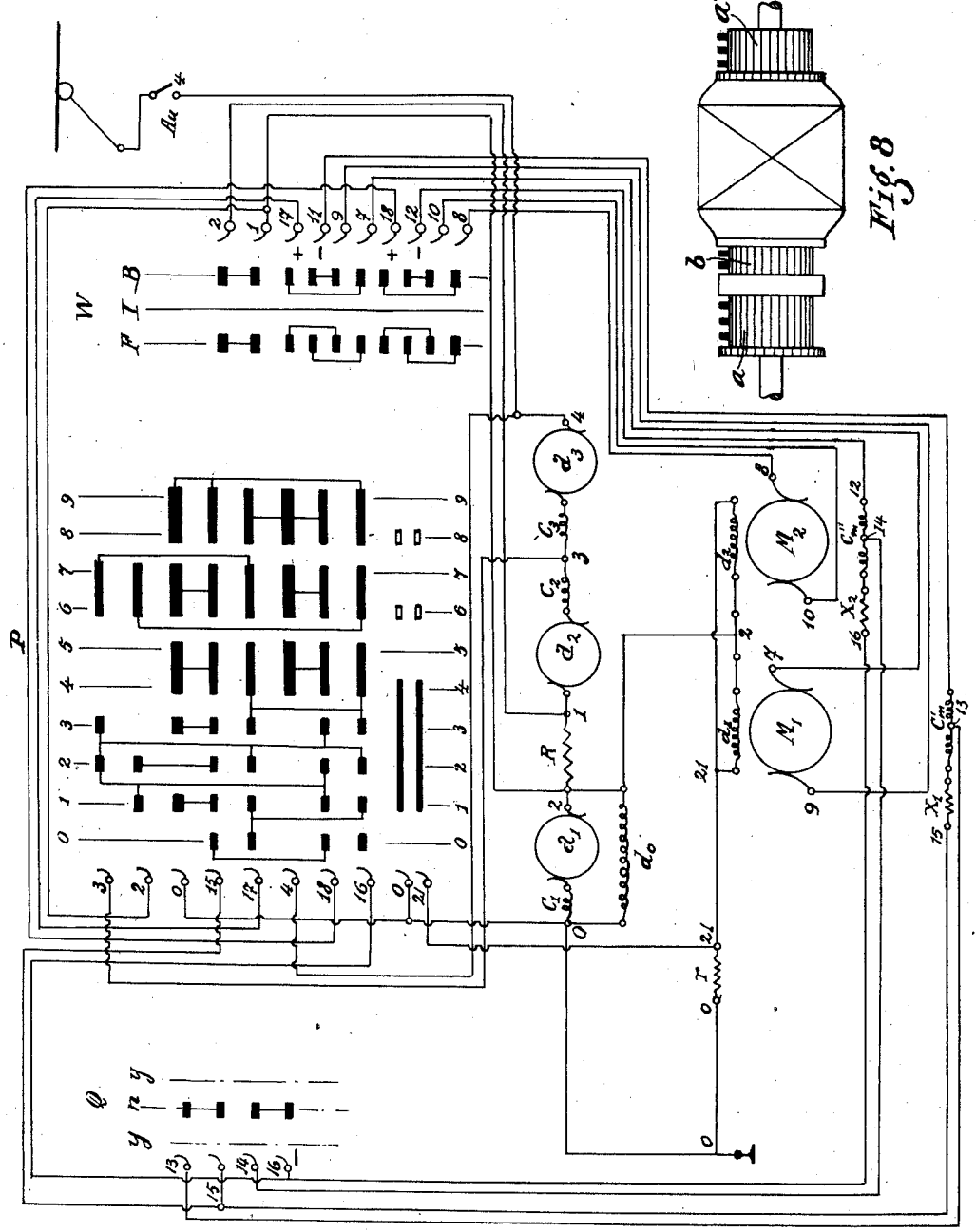
Inventor
G. Somajni
By Marks+Clerk
Attys.

Patented Dec. 17, 1929

1,739,562

UNITED STATES PATENT OFFICE

GIACOMO SOMAJNI, OF MILAN, ITALY

DIRECT-CURRENT SYSTEM

Application filed October 24, 1921, Serial No. 510,133, and in Italy November 10, 1920.

This invention pertains to a traction system, and particularly to a type of system with full recuperation. Such systems effect starting and braking without use of rheostats.

It is well known that full recuperation systems employing shunt and compound excited motors must have a gradually varying E. M. F. applied to field coils of the motor. The starting operation consists in gradually increasing the said voltage from 0 to the full line voltage to cause an increase in speed.

Systems involving this full recuperation have usually involved a double transformation of the energy, that is first from the electrical to the mechanical by means of a motor fed from the line, and then from the mechanical to the electrical by means of a dynamo coupled directly to said motor and feeding the traction motors. The variable excitation of said dynamo causes different motor speeds. Such systems necessitate a large auxiliary plant.

In contradistinction to such systems the present invention is characterized by the fact that the voltage on the traction motors is varied discontinuously instead of continuously. Thus, in going from one speed to another the voltages on the motors is increased by a relatively large increment instead of being increased gradually. The system comprises in general means for obtaining such discrete ranges in voltage and means for connecting the motors to the different voltage sources.

Figures 1 to 6 inclusive show schematically the various arrangements for obtaining the different voltages on the motors to obtain the different speeds.

Fig. 7 is a wiring diagram of the traction system.

Fig. 8 shows the dynamotor with three commutators in side view.

Figure 1:
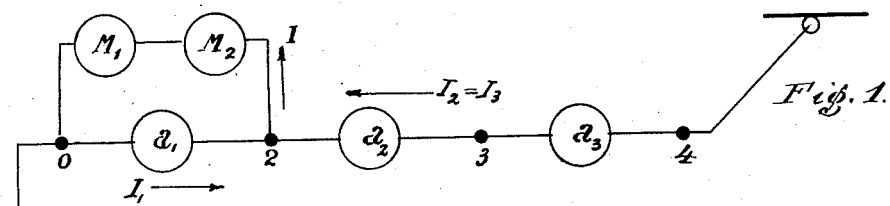

In Fig. 7, Q, P and W are controllers. $a_1$, $a_2$ and $a_3$ are the three windings of a dynamotor to be described below. $M_1$ and $M_2$ are the traction motors. $A_u$ is the automatic switch for connecting the system to the trolley wire. Like numbers on the diagram indicate points at the same potential.

The dynamotor comprises three windings $a_1$, $a_2$ and $a_3$ wound upon the same slots and upon the same armature. The windings are series connected, the number of turns of which are preferably in the ratio of 1:2:1: where $a_2$ has the largest number of turns. In this dynamotor depending upon how the motors are connected thereto, part of the windings will act as motors, the others acting as generators. The dynamic equilibrium obtains for any combination, the ampere turns for the windings acting as a dynamo balancing those for the windings acting as a motor, the direction of the current in the dynamo windings being in an opposite direction to the current in the motor windings. Under such conditions the armature reaction is always eliminated. The brushes are so arranged that the axis of the commutation zone coincide to the neutral zone, thus causing simultaneous commutation for all the conductors that are in the same slot. Each winding is connected to a separate commutator and may be tapped in any desired manner as described below.

$C_1$, $C_2$ and $C_3$ are the series field windings for the various windings of the dynamotor. It will be observed that the series windings will neutralize themselves when the dynamotor has started. They operate effectively on starting. R is an armature resistance which may be introduced between the windings of $a_1$ and $a_2$. $d_0$ is the shunt field winding for the whole dynamotor. $M_1$ and $M_2$ are the traction motors. $d_1$ and $d_2$ are the field windings for $M_1$ and $M_2$, respectively. $r$ is a motor shunt field rheostat which may be introduced into the shunt field of the motors when desired. $C'_m$ is the series field winding for motor $M_1$. $X_1$ is a resistance which may be introduced into the series field winding when the voltage on the motors is varied as will be described below. $C''_m$ is the series field winding for motor $M_2$. $X_2$ is a resistance which may be introduced into the series winding $C''_m$, for purposes analogous to the introduction of the series winding $X_1$.

The controller W as shown carries ten contact fingers in each of the positions F and B. Position I is the open circuit position of the controller W. B represents the position for the forward run of the train and F represents the position for the backward run of the train. Controller P regulates the various arrangements of the motor and dynamotor to give the conditions illustrated in Figures 1 to 6 which are described below in order to regulate the various speeds of the motor. Controller Q introduces or short circuits the motor armature resistance $X_1$ and $X_2$, the function of which is described below. The controller P has ten positions allowing for the various combinations described below. The controller Q is fitted with four contact fingers. When the controller Q is in the $n$ position which is the normal running position, the starting resistances $X_1$ and $X_2$ are short circuited and for all other positions, such as Y, these resistances are switched in. The controller Q is operated by the driver directly.

The wiring circuit for the dynamotor comprises:

Trolley—automatic switch $a_u$—cable 4—armature $a_3$—series winding $C_3$—cable 3—series winding $C_2$—armature $a_2$—cable 1—starting rheostat R of the dynamotor—cable 2—armature $a_1$—series winding $C_1$—cable 0—and rails.

The closing of the automatic switch starts the dynamotor with the resistance R switched in, when W is in the I position. When W is moved to either the F or the B position, R is short circuited across contacts 2 and 1 of controller W. Field coil $d_0$ is shunt across armature $a_1$. $d_2$ is therefore fed with ¼ of the voltage across the whole armature of the dynamotor. The current is generated as soon as the dynamotor has speeded up under the initial action of the three series windings $C_1$, $C_2$ and $C_3$.

The motor excitation circuits comprise two field coils $d_1$ and $d_2$ for motors $M_1$ and $M_2$ respectively, the wiring for which is as follows:

Cable 2—The two coils $d_1$ and $d_2$ of the motors connected in parallel—cable 21—field resistance $r$—cable 0—and rails.

The motors are excited as soon as the dynamotor is running. The amount of excitation is controlled by the resistance $r$.

The motor armature circuits comprise for motor $M_1$:

Cable 17—{Cable 9 (for W in F position) / Cable 7 (for W in B position)}—armature of $M_1$—

{cable 7 (for W in F position) / cable 9 (for W in B position)}—cable 11—series winding $C'_m$— cable 13—resistance $X_1$—with a portion of series winding $C'_m$—cabl 15.

The motor armature circuits comprise for motor $M_2$:

Cable 18—{Cable 8 (for W in B position) / Cable 10 (for W in F position)}—armature of $M_2$—

{cable 10 (for W in B position) / cable 8 (for W in F position)}—cable 12—series winding $C''_m$— cable 14—resistance $X_2$—with a portion of the series winding $C''_m$—cable 16.

It will be observed that the polarity of the armature for each circuit may be reversed to reverse the direction of running of the motor by shifting W from one position to the other, i. e. for instance from F to B or from B to F. The resistance X may be short circuited by means of the controller Q.

As is stated below controller P establishes the various arrangements of the motor and dynamotor windings shown in Figures 1 to 6 for different speeds of the motors, i. e. position 0 for starting, position 1 for first speed, etc.

Position 0 is the starting position of motors in series and resistances $X_1$ and $X_2$ in circuit.

Position 1 corresponds to connection shown in Fig. 1 with resistance $r$ short circuited.

Figure 2:
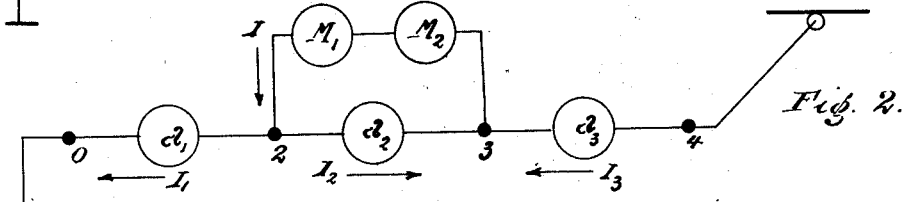

Position 2 corresponds to connection shown in Fig. 2 with resistance $r$ short circuited.

Figure 3:
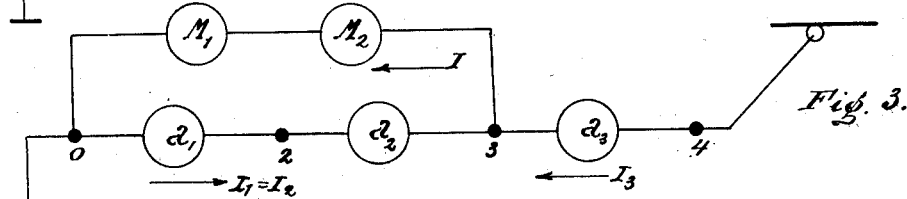

Position 3 gives the circuit shown in Fig. 3 with resistance $r$ short circuited.

Figure 4:
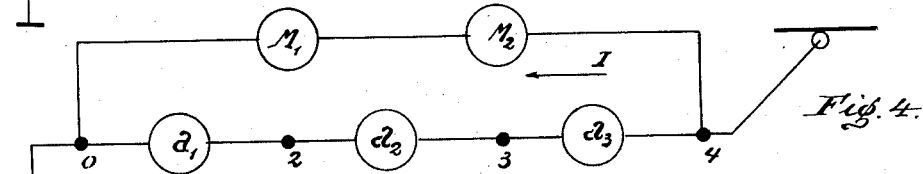

Position 4 gives the connection shown in Fig. 4 with resistance $r$ short circuited.

Figure 5:
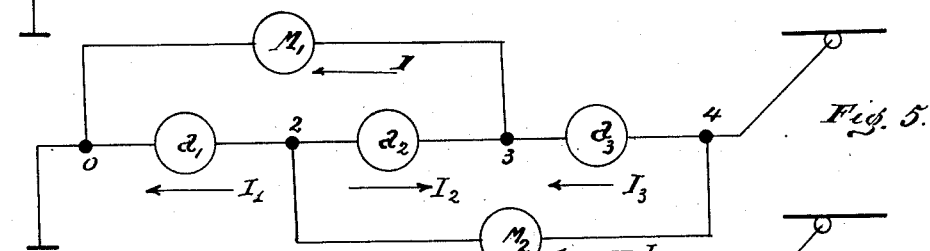

Position 5 gives the connection shown in Fig. 5 with resistance $r$ in circuit.

Position 6 gives the connection shown in Fig. 5 with resistance $r$ short circuited.

Position 7 gives the connection shown in Fig. 5 but with resistance $r$ in circuit.

Figure 6:
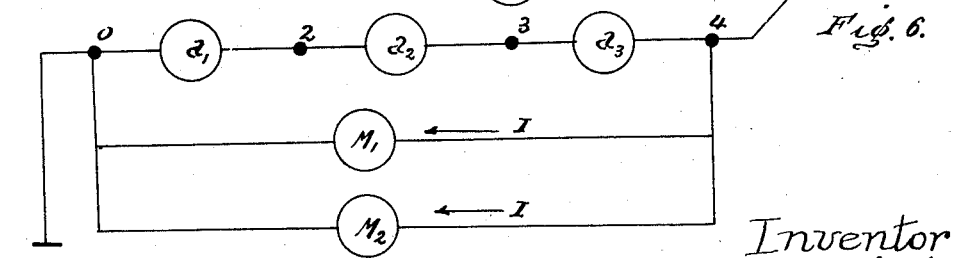

Position 8 gives the connection shown in Fig. 6 with resistance $r$ short circuited.

Position 9 gives the connection shown in Fig. 6 but with resistance $r$ in circuit.

The circuits for the different positions are as follows:

*Position 0.*—Resistance $r$ is in circuit giving minimum shunt excitation for the motors—2 motor armature circuits are in series. We have:

15—$X_1$—$C'_m$—11—9—armature of $M_1$—7—17—16—$X_2$—$C''_m$—12—10—armature of $M_2$—8—18—15.

This position is reached at the end of the braking, the short circuit currents generated in the armatures causing a complete stoppage of the train.

*Position 1.*—Resistance $r$ is short circuited across contacts 0 and 21 allowing for maximum shunt excitation of the motors. The remaining contacts on the controller P establish the following circuit wherein two motors are in series and connected across points 0 and 2 of the dynamotor.

2 at $a_1$—1 at W—2 at position 1 of P—18—8—armature of $M_2$—10—12—$C''_m$—$X_2$—16—17—7—armature of $M_1$—9—11—$C'_m$—$X_1$—15—0.

*Position 2.*—The resistance $r$ is short circuited across contacts 0 and 21. The remaining brushes establish the following circuit.

3—18—8—armature of $M_2$—10—12—$C''_m$—$X_2$—16—17—7—armature of $M_1$—9—11—$C'_m$—$X_1$—15—1 at W—2.

It will be seen that this connection allows for the maximum shunt excitation of the motors.

*Position 3.*—The resistance $r$ is short circuited across contacts 0 and 21. The remaining brushes establish the following circuit.

3—18—8—armature of $M_2$—10—12—$C''_m$—$X_2$—16—17—armature of $M_1$—9—11—$C'_m$—$X_1$—15—0.

This connection allows for maximum shunt excitation of the motors, establishes the motors in series across points 3 and 0 of the dynamotor.

*Position 4.*—The resistance $r$ is short circuited across contacts 0 and 21. The remaining brushes establish the following circuit.

4—18—8—armature of $M_2$—10—12—$C''_m$—$X_2$—16—17—7—armature of $M_1$—9—11—$C'_m$—$X_1$—15—0.

This, it will be seen also allows for maximum shunt excitation of the motors and establishes the motors in series across points 0 and 4 of the dynamotor.

*Position 5.*—This, it will be seen establishes a circuit similar to that of position 4 with the exception that resistance $r$ is in circuit so that we have reduced energization of the motors.

*Position 6.*—The resistance $r$ is short circuited across contacts 0 and 21—the remaining brushes establish the following circuits:

The motor $M_1$ is shunted across points 0 and 3 of the dynamotor. The motor $M_2$ is shunted across points 4 and 2 of the dynamotor, giving the following circuits:

3—17—7—armature of $M_1$—9—11—$C'_m$—$X_1$—15—0.   4—18—8—armature of $M_2$—10—12—$C''_m$—$X_2$—16—2.

Here again the motors operate at maximum shunt excitation.

*Position 7.*—The connection here is similar to that of position 6, but resistance $r$ is in circuit giving reduced excitation of the motors.

*Position 8.*—The motors $M_1$ and $M_2$ are in parallel and are connected across points 0 and 4 of the dynamotor with resistance $r$ short circuited across contacts 0 and 21.

$$4-\begin{Bmatrix}18-8-\text{armature of } M_1-10-12-C''_m-X_2-16-\\ 17-7-\text{armature of } M_2-9-11-C'_m-X_1-15-\end{Bmatrix}-0-$$

*Position 9.*—This gives the connection of position 8, but with resistance $r$ in circuit giving a reduced motor field excitation.

The above circuits permit of maximum efficiency. As was pointed out above, the windings $a_1$ and $a_3$ have the same number of active conductors while winding $a_2$ has twice as many. The distribution of potentials across the dynamotor windings is as follows:

Between 0 and 2, that is across $C_1$ and $a_1$, the voltage $V_1$ is equal to 1/4 of the line voltage V. Between 2 and 3, that is across $r$ and $a_2$ and $C_2$ the voltage $V_2$ is equal to 2/4 of the total line voltage V, and between 3 and 4, that is across $C_3$ and $a_3$ the voltage $V_3$ equals 1/4 of the total line voltage V. Across 0 and 3, that is across $C_1$, $a_1$, R, $a_2$, and $a_3$ the voltage is equal to 3/4 of the total line voltage, and the same potential difference exists between points 2 and 4.

By connecting the motors across any of these points there is obtained a means of varying the potentials on the motor by discrete steps, such action being obtained as described above.

Considering the connection in Fig. 1, two motors or motor sets $M_1$ and $M_2$ are connected in series across 0 and 2. The voltage applied to each of the motors is equal to 1/2 of $\frac{V}{4}=\frac{V}{8}$, viz 1/8 of the line voltage.

The current I flows through the motors and gives rise to two components in the dynamotor. One component $I_1$ flowing through $a_1$, another current $I_2$ flowing through windings $a_2$. This current $I_2$ being equal to a current $I_3$ flowing through winding $a_3$. Since the dynamic equilibrium of the machine supplied by constant potential V cannot be altered, the current $I_1$ must be opposite in sign to the current components $I_2=I_3$. Further the ampere turns due to the first component $I_1$ must be equal to the ampere turns due to the second component $I_2$. The second component flows through all the conductors of $a_2$ and $a_3$, i. e. it flows through a number of turns three times the number of turns traversed by component $a_1$. Let $n$ be equal the number of turns in $a_1$, then from the above it follows that $nI_1=-3nI_2$, but $I_2-I_1=I$. Therefore, $$I_1=-3/4\ I \text{ and } I_2=I_3=1/4 \text{ of } I.$$

That is the ampere turns due to I neutralize the magnetic action of the ampere turns due to $I_2=I_3$, reducing the armature reaction to 0. Of course, when the motor operates as a generator to produce braking the current shown in Fig. 1, and the following is true in all the other cases, are reversed.

Fig. 2 shows the second connection between motors and dynamotors according to which the motors $M_1$—$M_2$ are laid in series across 2 and 3, viz, across the terminals of $a_2$. For similar reasons to those set out above we have:

Tension at the ends of each motor:

$$\frac{1}{2}\cdot\frac{V}{2}=\frac{2}{8}V$$

$$I_1=I_3=\frac{1}{2}I \quad I_2=-\frac{1}{2}I$$

where I always represents the current of one motor.

The third connection is represented by Fig. 3. We have:

| | Motor power | Dynamotor power |
|---|---|---|
| Connection Fig. 1. | $\frac{2}{8}VI$ | $\frac{3}{4}I\frac{1}{4}V+\frac{3}{4}V\frac{1}{4}I=\frac{3}{8}VI$ |
| Connection Fig. 2. | $\frac{4}{8}VI$ | $\frac{1}{2}I\left(\frac{1}{4}+\frac{2}{4}+\frac{1}{4}\right)V=\frac{4}{8}VI$ |
| Connection Fig. 3. | $\frac{6}{8}VI$ | $\frac{1}{4}I\frac{3}{4}V+\frac{3}{4}I\frac{1}{4}V=\frac{3}{8}VI$ |
| Connection Fig. 4. | $\frac{8}{8}VI$ | zero |
| Connection Fig. 5. | $\frac{18}{8}VI$ | $\frac{1}{2}I\left(\frac{1}{4}+\frac{2}{4}+\frac{1}{4}\right)V=\frac{4}{8}VI$ |
| Connection Fig. 6. | $\frac{16}{8}VI$ | zero |

Tension at the ends of each motor:

$$\frac{1}{2}\cdot\frac{3}{4}V=\frac{3}{8}V$$

$$I_1=I_2-\frac{1}{4}I \quad I_3=\frac{3}{4}I$$

The fourth connection Fig. 4 does not give rise to any current in the dynamotor, the currents just compensating.

It is the ordinary series position of the motors and the dynamotor runs light. We have:

Tension at the terminals of each motor:

$$\frac{4}{8}V$$

$$I_1=I_2=I_3=0.$$

With the fifth connection (Fig. 5) the two motors $M_1$—$M_2$ are separately fed with a tension $3/4\ V$ which is obtained in two ways, viz, by connecting $M_1$ across 0 and 3 and $M_2$ across 2 and 4. The current I of the motor $M_1$ sets up in the dynamotor equal components to those of the third connection, and the same current I of the motor $M_2$ sets up equal components to those of the first connection but of opposite sign. It will be readily seen that the algebraic sum of the said components produces in each winding of the dynamotor an equal distribution of currents to those of the second position. We shall therefore have for the fifth connection:

Tension at the terminals of each motor:

$$\frac{6}{8}V$$

$$I_1=I_3=1/2\ I \quad I_2=-1/2\ I.$$

The sixth connection (Fig. 6) represents the full speed position, with the two motors directly in parallel on the line and with the dynamotor running light. We have:

Tension at the terminals of each motor:

$$\frac{8}{8}V$$

$$I_1=I_2=I_3=0.$$

The following is a comparison of the power absorbed by the motors and by the dynamotors for the various positions.

It will be seen that the aggregate power of the dynamotor is, at the most, the fourth part of the full load power $\left(\frac{16}{8}VI\right)$ for which the motors are designed. It could be readily demonstrated that any other voltage ratio between the various windings or any alteration in the connections set out above would entail a higher dynamotor power. The same would be the case if a dynamotor with two windings only were used, which, in order to realize the same voltage range, should divide the line voltage into two portions in the ratio 1:3. This would make the second and fifth connections impossible and increase the dynamotor power, and would also entail the drawback of rendering the machine less capable of withstanding high tensions.

The above comparison between the power absorbed by the motors and the aggregate power of the dynamotor windings confirms the high efficiency of the energy transformation carried out by the dynamotor; this transformation always is a partial one and represents a percentage which decreases according as the power absorbed by the motors is increased (see foregoing table).

The application of the voltages by discrete steps as described above sets up current peaks in the motors during the passage from one voltage to another. These current peaks are partly and automatically reduced by the compound excitations of the motors. The motors are superexcited on starting due to the high starting currents and low back E. M. F., the motors being thus unexcited when the currents are braking currents and the E. M. F. is in excess. One may also regulate the shunt excitation itself while the motor is under a predetermined voltage. This allows for a reversible operation. In fact when starting the superexcited positions must precede the positions with reduced excitation. During braking the reverse must be the case. This is, of course, directly obtainable because the braking operation is the reverse of the starting operation.

However, compound and the regulation of the shunt excitation are subsidiary means for reducing the voltage peaks which are efficient only in the control positions corresponding to higher speeds, and therefore higher velocities, that is to say, when the back E.M.F. forces set up in the motors far exceed the ohmic drops. At such positions a small variation in the field excitation and therewith in the said back E. M. F. is sufficient to adjust the motor currents but in the lower control position, that is to say for position of lower speed, weak starting rheostats must be used in order to cut down the current peaks in the motors resulting from the sudden changes in the potential. These rheostats are adapted to be switched in periodically during the passage from one voltage to another. These resistances control the series field circuits in the specific examples described and correspond to resistances $X_1$ and $X_2$. These rheostats may be inserted periodically for all control positions, that is for all speeds. It is obvious that in the higher positions, that is in the position for highest speeds, two methods of adjustments of the currents in the motor during the passage from one voltage to another are coexisting, one due to the shunt excitation and the other due to the insertion of these resistances. Therefore greater voltage differences in passing from one running position to another are permissible in the positions corresponding to the higher speeds.

In view of the above provision is made for the insertion of the resistances $X_1$ and $X_2$ into the series field coils $C'_m$ and $C''_m$, respectively, just before a higher voltage is applied to the motors. As was described above P is stepped forward from one position to another at a time when the resistances $X_1$ and $X_2$ are in circuit.

The operation of the system is as follows:
The switch $a_u$ is closed. First of all the driver rotates W from position I to B or F according to the direction of travel.

For starting the train Q is moved in a determined direction. For this operation the starting resistances $X_1$ or $X_2$ are alternatively switched in and short-circuited in each position which in succession assumes the cylinder P.

By stopping the operation in any point whatever the vehicle ceases its acceleration and proceeds at uniform speed. By rotating on the contrary the cylinder in opposed direction a reversal of current is produced and a gradual braking with recovery of power will take place. The said braking will continue until the cylinder P comes back to the position 0 that is until almost the entire kinetic power possessed by the vehicle will be transformed again and bring the vehicle to stop.

It would be useless to add that by the said simple operation it will be possible to adjust at any given moment the speed of the vehicle and recover by braking a great portion of the power absorbed in the acceleration.

I claim:

1. In an electric traction system operating from supply mains, the combination of at least two sets of compound excited motors, each set comprising at least one motor and two terminals, a controlling device having a series of contacts connected to the said terminals, a dynamotor having, on one common armature core, a plurality of windings connected together in series across the supply mains, the end and intermediate connecting points of the said windings being connected to a further series of contacts on said controller, and means in the said controller for so connecting the dynamotor series of contacts and the motor series of contacts that movement of the said means in one direction alters the tapping points of the dynamotor from which the motors are fed and connects the motor sets in series and parallel in such a manner that the voltage applied during driving to each set of motors increases by successively increasing steps to a maximum.

2. An electric traction control system as claimed in claim 1, wherein the dynamotor windings are constituted by three separate windings in series sharing the supply mains voltage in the ratio of 1:3:2 for the purposes set forth.

Signed at Milan, Italy, this 7th day of October, 1921.

GIACOMO SOMAJNI.